(12) United States Patent
Döhring

(10) Patent No.: US 9,663,951 B2
(45) Date of Patent: May 30, 2017

(54) DIRECTLY PRINTED, COATED PANEL

(75) Inventor: Dieter Döhring, Großenhain (DE)

(73) Assignee: Kronoplus Technical AG, Niederteufen (CH)

( * ) Notice: Subject to any disclaimer, the term of this patent is extended or adjusted under 35 U.S.C. 154(b) by 0 days.

(21) Appl. No.: 14/390,131

(22) PCT Filed: Apr. 2, 2012

(86) PCT No.: PCT/EP2012/055967
§ 371 (c)(1),
(2), (4) Date: Oct. 15, 2014

(87) PCT Pub. No.: WO2013/149644
PCT Pub. Date: Oct. 10, 2013

(65) Prior Publication Data
US 2015/0064421 A1    Mar. 5, 2015

(51) Int. Cl.
*B23B 3/10* (2006.01)
*E04C 2/20* (2006.01)
(Continued)

(52) U.S. Cl.
CPC .............. *E04C 2/20* (2013.01); *B05D 1/305* (2013.01); *B05D 1/36* (2013.01); *B05D 3/067* (2013.01); *B05D 7/542* (2013.01); *B32B 27/08* (2013.01); *B32B 27/32* (2013.01); *B32B 27/322* (2013.01); *B44C 5/04* (2013.01); *B44C 5/0461* (2013.01); *B44C 5/0476* (2013.01); *C09D 11/101* (2013.01); *E04C 2/24* (2013.01); *E04C 2/30* (2013.01); *E04C 2/44* (2013.01); *E04F 13/00* (2013.01); *E04F 13/0866* (2013.01); *E04F 13/0871* (2013.01); *E04F 15/02* (2013.01);
(Continued)

(58) Field of Classification Search
None
See application file for complete search history.

(56) References Cited

U.S. PATENT DOCUMENTS 6,310,115 B1 * 10/2001 Vanmaele ............ C09D 11/101
                                                                    106/31.13
2002/0081393 A1    6/2002 Kjellqvist et al.
(Continued)

FOREIGN PATENT DOCUMENTS

BE    WO 2010070474 A2 *  6/2010  ............... B44C 1/10
CN    1693383 A    11/2005
(Continued)

OTHER PUBLICATIONS

International Search Report for corresponding patent application No. PCT/EP2012/065146 dated Oct. 1, 2013.
(Continued)

*Primary Examiner* — Christopher Polley
(74) *Attorney, Agent, or Firm* — Renner, Otto, Boisselle & Sklar, LLP

(57) ABSTRACT

The present invention relates to a panel, in particular a wall-, ceiling or floor-panel, comprising a carrier layer (71) with a front side and a rear side, wherein the carrier layer (71) comprises at least at its front side as seen from the front side the following layers: a primer layer (72); a decor layer (73), comprising a polymerizable print color; and a polymer layer (74), which preferably comprises a hardness gradient.

26 Claims, 4 Drawing Sheets

(51) Int. Cl.
| | |
|---|---|
| *B44C 5/04* | (2006.01) |
| *B32B 27/08* | (2006.01) |
| *B32B 27/32* | (2006.01) |
| *B05D 7/00* | (2006.01) |
| *C09D 11/101* | (2014.01) |
| *E04C 2/24* | (2006.01) |
| *E04C 2/30* | (2006.01) |
| *E04B 2/00* | (2006.01) |
| *E04F 13/08* | (2006.01) |
| *E04F 15/02* | (2006.01) |
| *B05D 1/30* | (2006.01) |
| *B05D 1/36* | (2006.01) |
| *B05D 3/06* | (2006.01) |
| *E04F 13/00* | (2006.01) |
| *B05D 5/06* | (2006.01) |
| *B05D 1/28* | (2006.01) |
| *E04F 15/10* | (2006.01) |
| *E04C 2/00* | (2006.01) |

(52) U.S. Cl.
CPC ........... *E04F 15/10* (2013.01); *B05D 1/28* (2013.01); *B05D 5/06* (2013.01); *B05D 2203/20* (2013.01); *B32B 2419/04* (2013.01); *B32B 2471/00* (2013.01); *B32B 2607/00* (2013.01); *E04C 2002/005* (2013.01); *E04F 15/107* (2013.01); *Y10T 428/24851* (2015.01)

(56) References Cited

U.S. PATENT DOCUMENTS

| | | | |
|---|---|---|---|
| 2004/0071978 | A1 | 4/2004 | Hallenbeck et al. |
| 2004/0146695 | A1 | 7/2004 | Hardwick |
| 2004/0219339 | A1 | 11/2004 | Dempsey et al. |
| 2010/0098963 | A1* | 4/2010 | Dohring .......... B05C 1/14 428/537.1 |

FOREIGN PATENT DOCUMENTS

| | | |
|---|---|---|
| CN | 101220221 A | 7/2008 |
| CN | 101495243 A | 7/2009 |
| DE | 197 02 476 A1 | 7/1998 |
| DE | 20 2004 018710 U1 | 3/2005 |
| DE | 10 2009 044092 A1 | 3/2011 |
| DE | 10 2010 011602 A1 | 9/2011 |
| EP | 2 269 744 A2 | 1/2011 |
| RU | 2426604 | 11/2007 |
| WO | 2008/061791 A1 | 5/2008 |
| WO | 2008/122668 A1 | 10/2008 |
| WO | 2010/070474 A2 | 6/2010 |

OTHER PUBLICATIONS

International Search Report for corresponding patent application No. PCT/EP2012/055967 dated Jan. 25, 2013.
Office Action for related Chinese Application No. 201280072235.0 dated Jul. 22, 2016.

* cited by examiner

DIRECTLY PRINTED, COATED PANEL

1. FIELD OF THE INVENTION

The present invention relates to a coated panel, in particular a wall-, ceiling- or floor-panel as well as to a method for coating of such panels.

2. BACKGROUND

From the prior art a multitude of panels for wall-, ceiling- or floor-coverings are known. Herein, in the last years, in particular so called laminate panels, spread more and more. Laminate panels are relatively cheap and can be handled relatively easy. Commonly, they base on a carrier board (carrier layer) consisting of Medium Density Fiberboard material (MDF-material) or High Density Fiberboard material (HDF-material) wherein a decor paper, which is impregnated with a resin, is applied. Above the decor paper, commonly in addition, a so called overlay paper is arranged in order to improve the sustainability of the surface. The used papers are impregnated by resins, like for instance by amino resins, which cure by pressing under the impact of heat and pressure. In order to improve the abrasion resistance of the surfaces, the resins in addition are often provided with abrasion-resistant particles.

In an improved embodiment of such laminate panels, so called directly printed panels have been developed. For these directly printed panels in general no papers are used anymore, in particular no decor papers. The decor layer is printed by the use of dispersion paint by means of a gravure printing directly onto the surface of the panel, which is commonly provided with a suitable primer layer. Commonly, the primer layer is applied by drums. After the drying of the decor layer, in the following several resin layers are applied and cured. The resin layers serve as a protective coating and abrasion-resistant surface. In order to increase the abrasion resistance, also here often abrasion-resistant particles, commonly corundum particles, are embedded into the resin layer.

From WO 2007/042258 A1 for instance a method for the direct printing of wood material boards is known, wherein in one single coating step a relatively thick protective coating consisting of polymer material is applied onto the surface of a board. Herein, the used polymer material is a polymerizable acrylate system, which cures by polymerization. Herein, the polymerization is started by radiation, so that a complete conversion takes place through the thickness of the applied layer.

WO 2008/061791 A1 of the same applicant discloses a further development of the known prior art. The content of this document is herein incorporated in its entire extent by reference. The core of the improvement in this document lies in that two liquid polymer layers are applied wet-in-wet onto the surface of a panel so that partial mixing of the coating agents takes place. These two wet-in-wet applied layers are then cured in one common step, wherein the resulting cured coating comprises a hardness gradient due to the partial mixing, wherein the hardness of the coating decreases with the increasing depth as seen from the surface of the resulting coating.

Although, in particular, WO 2008/061791 A1 is a significant improvement in the prior art, still a further need for improvement exists. Thus, it is the problem of the present invention to improve the known prior art and in particular to provide a coated panel, wherein the adhesion of the layers is increased and which achieve due to that particularly good values in the grid cut test according to DIN ISO 2409.

This and other problems, which are mentioned during the reading of the following description or which can be gathered by the person skilled in the art, are solved by a panel according to claim 1 and by a method according to claim 15.

3. DETAILED DESCRIPTION OF THE INVENTION

A panel according to the invention comprises a carrier layer with a front side and a rear side. The carrier layer is for instance a board made of a wood material, like for instance MDF (Medium Density Fiberboard) or HDF (High Density Fiberboard), a chip board, an OSB-board (Oriented Strand Board) or the like. However, it may also consist of a polymer material, like for instance PVC. At least at the front side of the carrier layer, a layer system is provided, which comprises, as seen from the carrier layer outwards: a primer layer, a decor layer and a polymer layer as use layer, which preferably comprises a hardness gradient according to the already described document WO 2008/061791 A1 of the same applicant. The specific aspect concerning the decor layer lies in the use of a polymerizable print color (ink), in particular basing on a polymerizable acrylate. The decor layer is preferably printed directly onto the panel and then consists in general of the print color. However, alternatively, a printed paper may be used as decor layer (decor paper) as it is common for laminate panels.

Commonly in the prior art, dispersion colors are used as print color (ink), like for instance acryl colors. These dispersion colors are often used for the commonly used gravure printing method. Dispersion colors are print colors, which consist commonly of three main components, namely (a) a solvent (commonly water), (b) a binder agent like polymers (acrylates), which arrange themselves at each other, when the solvent evaporates and then form a rigid layer, as well as (c) color pigments for the generation of the desired coverage and the desired color. The hardening of this dispersion color is thus not carried out by a polymerization, but by an evaporation of the solvent, since the binder agents are already provided as polymers. The polymers, which are contained in the dispersion connect with each other in a completely physical manner, when the solvent evaporates, and a form a rigid, continuous layer.

The applicant now surprisingly found that improved adhesive properties of the layer system can be achieved, when polymerizable print colors are used in spite of the common dispersion colors. This is in particular true for the preferred application with a polymer layer, in particular with hardness gradient. The positive effect is particularly strong when the print color of the decor layer and the polymer layer are cured and respectively polymerized in one common step (when the decor layer is directly printed, like for instance by digital printing, the decor layer quasi consists of the print color). Due to the curing of a polymer layer and respectively of a polymerizable print color (like polymerizable acrylates and respectively UV-reactive colors in general), herein a chemical reaction is understood, which takes place during the polymerization, like for instance a polycondensation. This has to be differentiated from the drying of such layers, wherein only the solvent, like for instance the water contents of the print color and respectively of the polymer layers evaporate or are reduced in a completely physical manner. By the curing of the acrylate systems of the print color and the polymer layer in one common step (polymerization/polycondensation), a chemical crosslinking takes place in the border area of the two layers. It is assumed that this chemical crosslinking is responsible for the improved adhesion of the layers. The commonly used dispersion print colors do not comprise any polymerizable acrylate systems, so that no chemical crosslinking of print color, i. e. the decor layer, and the polymer layer takes place.

Polymerizable acrylates, as they are preferably used for the present invention, comprise as main components acrylate-monomers, -oligomers and optionally photoinitiators. The photoinitiators effect at the impact of radiation a polymerization of the monomers and respectively the oligomers, wherein the print color cures quickly. The use of a print color basing on a polymerizable acrylate together with a polymer layer (as use layer), which is applied thereon, allows advantageously to omit a primer layer, as it was commonly necessary in the prior art in order to increase the adhesion of the polymer layer on the decor layer. It has been shown that the dispersion colors, which have been commonly used in the prior art just achieve an unsufficient adhesion with the polymer layer with hardness gradient, which is applied thereon. It has been tried in the prior art to eliminate this disadvantage by the use of a primer layer between the decor layer and the polymer layer (use layer).

Commonly preferred for the present invention are polymerizable print colors as print colors and in particular polymerizable acrylate systems. Polymerizable print colors comprise as main components binder agents, namely, resins, which comprise reactive double bonds; monomers and respectively oligomers like for instance acrylate monomers and acrylate oligomers; optionally photoinitiators for radiation-curable print colors; additives like for instance defoaming agents, deviating additives, thickening agents and the like; color pigments like phtalocyanin-pigments, azo-colorants, indigoid colorants, aniline black dye and/or pigment blacks; as well as additives for achieving specific physical and/or technical properties. Furthermore radiation-curable print colors, like for instance print colors, which can be cured by UV-radiation (UV-curable print colors) are generally preferred as print colors for the present invention. An UV-curable polymerizable acrylate system is particularly preferred as print color.

Preferably, the primer layer bases on an aqueous dispersion (preferably of an aqueous acrylate system), which comprises a suitable composition so that it can be applied by means of a curtain coating method. In the prior art, up to now the primer layer has been commonly applied by means of a drum application method onto the surface of the carrier layer. In such drum application methods, the coating material (the primer layer) is directly dispensed from the drum onto the surface to be coated or indirectly via a coating belt, which is pressed by means of a pressing drum onto the objects to be coated. The inventors of the present invention have found that surfaces, which are manufactured in that way, do not achieve the estimated resolution and sharpness like they are particularly needed for high resolution print images, as they are typically necessary for the reproduction of real wood surfaces. In particular during the use of polymerizable print colors, disturbing stripes in the print image come up. The inventors now have surprisingly found that these problems can be avoided, when a curtain coating method is used in spite of a drum application method. It is assumed that the drums in the drum application method generate due to their round shape in the transferred coating a slight waviness of the surface. Herein it does not matter whether the coating material is directly applied from the drum onto the surface to be coated or indirectly via a coating belt. The mountains and valleys of this wavy surface are, however, so small that the surfaces can be printed well, which are manufactured in that manner by means of common dispersion colors. However, it is assumed that this very small unevenness of surfaces, which have been coated in that manner, are responsible for the mentioned problems, when polymerizable print colors are used. In that case by the casting of the primer layer, the undesired stripe-building can be effectively avoided for the use of polymerizable print colors (in particular polymerizable acrylate systems).

Curtain coating methods and corresponding machines are known to the person skilled in the art from the prior art (for instance from EP 1 252 937 A1) so that a detailed description thereof will be omitted. It is important that a liquid curtain of coating material is generated in the curtain coating method, wherein the objects to be coated are guided through the liquid curtain. An application by means of drums does not take place.

After the curing, the entire thickness of the polymer layer (use layer) should preferably comprise a thickness of 20300 µm, more preferred of 40-250 µm, even more preferred of 50-220 µm and most preferred of 60-180 µm. Preferred materials for the polymer layer are: 1,6-hexandioldiacrylate, polyesteracrylate, polyurethanacrylacidesther and dipropylendiglycoldiarcylate. Preferred values for the thickness of the primer layer (after the curing) are 20-300 µm, more preferred 40-250 µm, even more preferred 50-220 µm and most preferred 60-180 µm. It is in general preferred that the primer layer preferably does not comprise any UV-curable lacquer. The thickness of the decor layer commonly comprises a range of some nano- to micrometers, preferably 1 to 5 µm; more preferred 2 to 4 µm in order to achieve a sufficient coverage of the color.

As initially mentioned, in a preferred embodiment of the invention, the print color of the decor layer is cured (polymerized) together with the polymer layer applied thereon in one common step, preferably by one common radiation step. By doing so, in the border area between the print color and the thereon applied polymer layer in parts a chemical connection of the used polymers takes place. It has been shown that a particularly good adhesion of the polymer layer on the carrier layer can be achieved by that. In the prior art, it was up to now always necessary to use in addition a primer layer between the decor layer and the polymer layer applied thereon, in order to increase the adhesion of the polymer layer. By the preferred embodiment of the invention, the primer layer not only can be omitted, but it has been even shown that the achieved adhesion of the polymer layer can be increased in comparison to common primer-based systems. Preferred embodiments of the invention achieve in the grid cut test according to DIN ISO 2409 a grid cut parameter of at least 2, preferably of at least 1 and most preferred of 0. Of course, these values relate to the finished panel, when all layers have been cured.

In the following, the invention will be described by means of some non-limiting examples:

EXAMPLE 1: PANEL WITH THE COMMON INDIRECT GRAVURE PRINTING

In a first step a HDF-carrier board comprising a thickness of 8 mm is provided with a primer layer basing on common aqueous acrylate dispersion by means of a drum application machine. In a next step, the smoothing of the board is carried out by means of a filler basing on a highly filled aqueous acrylate dispersion, which is applied by a drum application machine. In the following a print base (primer layer) is applied on the basis of an aqueous acrylate dispersion, which is filled with filling material and color pigments, by means of a casting process (i. e. a curtain coating method).

An intermediate drying is carried out at temperatures between 80 and 200° C. after each of these coating steps. The boards, which have been treated in that manner are guided to a printing machine, which comprises in general a gravure drum and a rubber drum for the transfer of the print image from the gravure drum to the board. The print image is generated by three sequent printers, wherein each printer applies a specific dispersion print color consisting of color pigments and an aqueous acrylate dispersion. For instance, for an imitation of dark walnut wood, for instance 5 g/m² print color is applied. In a further process step, a common UV-primer layer is applied by means of a drum application machine onto the layer consisting of print colors. Finally, the application of a double-bonds-containing oligomer, which comprises photoinitiators and which is curable by radiation, is applied. On top of this layer, a further layer of a double-bonds-containing radiation-curable oligomer, which comprises photoinitiators, is applied above a structure carrier foil and is polymerized by means of UV-radiation. After the withdrawing of the foil, a completely coated decor board is produced, which can be separated in a further process into panels, wherein known coupling members are fitted at these panels. The board, which has been coated in that manner, is subjected to a laboratory test. In that case in the grid cut test a 3 is achieved. It can be generally said that the thicker the print color layer has to be for the reproduction of a decor, the worse is the result of the grid cut test. The milling of profiles for the coupling members is more difficult, since insufficient edges of the polymer layer are often generated.

EXAMPLE 2: PANELS, WHEREIN THE PRINT IMAGE IS GENERATED BY MEANS OF RADIATION-CURING PRINT COLORS

Again, a HDF-carrier board comprising a thickness of 8 mm is used. As it is described in example 1 the HDF-carrier board is provided with an aqueous primer, filler and printing ground. On the board, which has been treated in that manner, the same decor image like in example 1 is generated by means of a digital printer. However, herein no dispersion colors are used, but LTV-radiation-curing digital print colors. For the generation of the print image, a color amount of about 2 g/m² is needed. Initially the color is fixed by means of a pressure of 150 mJ/cm² (mercury). In a next step, the application of 2 g/m² of a first LTV-curing layer is carried out, which predominantly comprises dipropylenglycoldiacrylate. On top of that non-radiated layer, a double-bonds-containing oligomer, which comprises photoinitiators, like in example 1, is applied. In the following, on top of that layer a second oligomer layer is applied like in example 1 by means of a structure providing foil. The layer package is directed to an LTV-radiation source and herein, the radiation-curing layers are polymerized. The herein resulting polymer layer comprises the print color and all overlaying layers. Also panels, which have been manufactured on that basis, are subjected to a laboratory test. In the grid cut test, no flaking occurs within the different coating layers. It is just possible to damage the HDF-carrier board during the stripping of the adhesive tape.

The present invention also relates to a method for coating a panel. In this method according to the invention, a primer layer is applied onto a carrier board, preferably by means of a curtain coating method. After an optional drying of the primer layer a decor layer is applied, i. e. directly printed, by means of a polymerizable print color, e. g. basing on a polymerizable acrylate, preferably by digital printing, i. e. by direct printing. As decor, all common decors are possible, like in particular the imitation of real wood surfaces. In the following, in an optional step, a partial curing of the print color may be carried out. Herein, at least 10% but less than 50% of the polymerizable acrylate in the print color should be cured, more preferred less than 30% and even more preferred less than 20%. It has been shown that this partial curing leads to improved results in the grid cut test. After the application of the decor layer, a first liquid coating agent (first polymer) is applied onto the incompletely cured print color and preferably in a second step, at least a second liquid coating agent (second polymer) is applied onto the still wet first coating agent so that in the border area a partial mixing of the coating agents takes place. In a following step, the coating agent or the two applied coating agents are cured together with the print color in one single common step, preferably by means of radiation. For the case that a hardness gradient is desired, the first and second coating agents are not allowed to become completely mixed, wherein the hardness of the coating decreases with increasing depth as seen from the surface of the resulting coating after the curing. This will be described in more detail in the description of the drawings.

Of course, the explanations, which have been given in the context of the description of the panel, are also true for the method according to the invention in an analog manner. This is in particular true for the description concerning the preferred materials for the primer layer, print color and polymer layer, the thicknesses thereof etc.

As already mentioned, a core of the invention lies in the common curing of the coating agents (polymer layers) and of the polymerizable print colors, in particular print colors, comprising a polymerizable acrylate. That means that the coating agent is applied onto the not yet cured print color in a liquid manner, so that also here in the border area a specific mixing of the different materials takes place. Thus, in the following common curing step chemical bonds are generated between the print color and the coating agents, what—according to the opinion of the inventors—leads to particularly good mechanical resistance values of the panels, which are coated in that manner. In the prior art, the adhesion was generated in general just by physical processes, since no common curing, i.e. polymerization between the print color and the applied polymer layers, took place.

For the coating agent of the first and also of the second and possibly of further polymer layers, a single polymerizable substance may be chosen or mixtures thereof. Particularly suited substances are polymerizable acrylates in general and in particular the following: 1,6-hexandioldiacrylate, polyestheracrylate, polyurethanacrylacidesther and dipropylendiglycoldiarylate. For the first layer, a mixture of 1,6-hexandioldiacrylate and polyestheracrylate is particularly suited and for the second layer a mixture of polyurethanacrylacidesther and dipropylendiglycoldiarylate. Moreover, in the coating agent additives may be contained, like for instance flow-providing agents, moistening agents, colorants, abrasion resistant particles etc. It is essential herein that these further additives allow the other components to carry out the above described partial mixing and thus a bonding of the first and second layers so that a polymerization is still possible, if a hardness gradient is desired.

In a generally preferred embodiment, the primer layer also comprises colorants so that the applied primer layer comprises a suitable homogenous color. This color is preferably adapted to the decor to be applied later on. If for instance the decor layer is designed to reproduce dark oak wood, a primer layer is preferably provided in a corresponding dark brown color.

4. DETAILED DESCRIPTION OF EXEMPLARY EMBODIMENTS

In the following, now a detailed description of exemplary embodiments is given by means of the accompanying diagrams and figures. Herein, the production of a polymer layer with a hardness gradient will be described by means of the FIGS. 1 to 6 analog to WO 2008/061791 A1.

Figure 1:
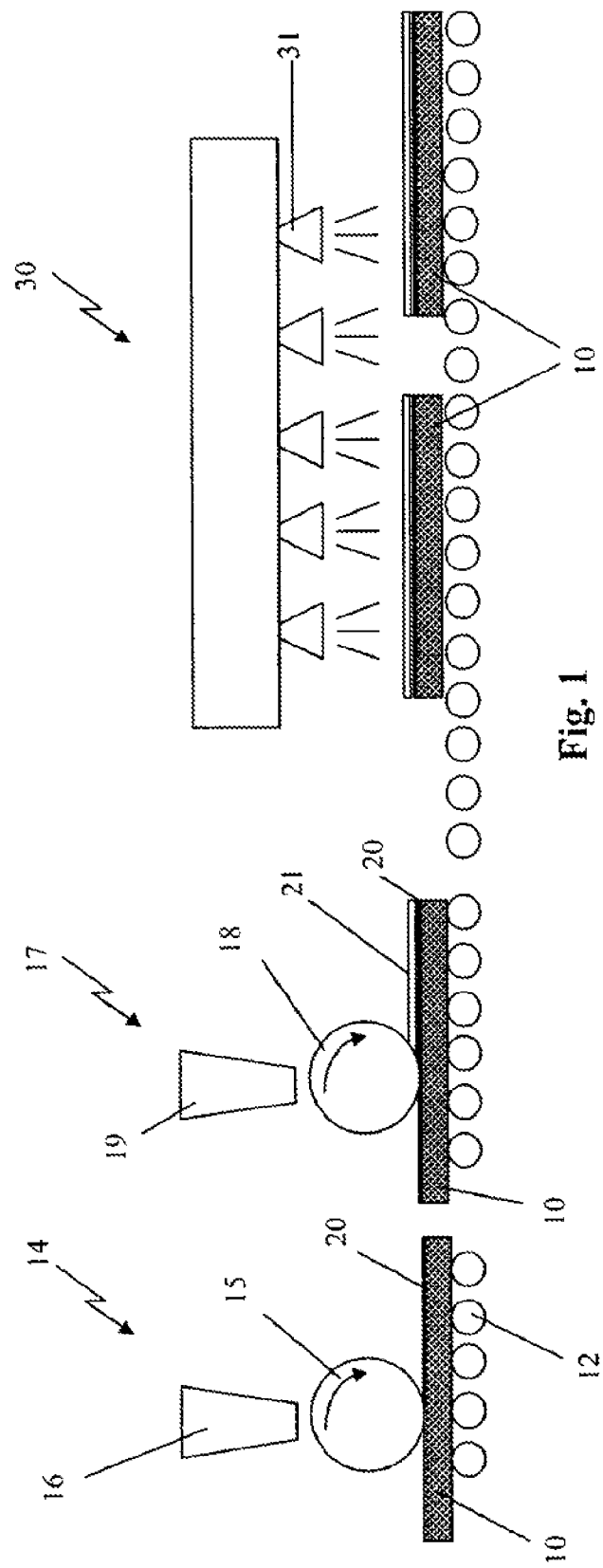
FIG. 1 is a schematic view of a coating process for the manufacturing of a polymer layer with a hardness gradient according to the prior art.

In FIG. 1 a coating machine for the coating of wood material boards 10 is schematically shown. The wood material boards 10, like for instance solid wood boards, HDF-, MDF- or chip boards, are guided by a roller conveyor 12 through different stations of the coating machine. In a first coating station 14 a first liquid coating agent 20 is applied by means of a rotating application drum 15 onto the wood material boards 10 by means of a passage coating. The application drum 15 is supplied with a coating agent by a supply device 16. In the second coating station 17 a second liquid coating agent 21 is applied onto the still wet first coating agent 20 by means of a further rotating application drum 18. The application drum 18 is supplied with the second liquid coating agent by means of a supply device 19. Of course, the application can be also carried out with any other suitable application method, like for instance by spraying or by a coating knife and the like. It is only important that the application of the second layer is carried out while the first layer is still wet enough so that a partial mixing of the layers takes place. Moreover, of course further coating stations may be provided after the second station 17, in order to apply for instance a third liquid coating agent onto the still wet second coating agent 21 or also additional stations, in order to apply abrasion resistant particles onto or into the wet layers.

After leaving the coating station 17, the coated boards 10 are transported to a curing station 30, where the layers are cured by means of UV-radiators 31. On their way from the coating station 17 to the curing station 30 the partial mixing of the liquid coating agents 20 and 21 takes place, which happens particularly in the border area of the two coating agents. In general, the mixing rate is the larger the nearer the point of interest is located at the border of the two layers. By the curing of the layers in the curing station 30, the mixing process is stopped and the set mixing ratio, and thus the mechanical properties of the generated coating, is fixed. The dimension of the mixing in the border area—which happens on its own terms and preferably without any mechanical impact from outside—depends on the duration, which passes between the application of the second coating agent 21 onto the still wet first coating agent 20 and the curing at the curing station 30. In addition, the mixing of the two coating agents is also influenced by the specific viscosities of the coating agents, wherein it is seen as a rule of thumb that the higher the viscosity is the lower the mixing per time unit is.

Figure 2A:
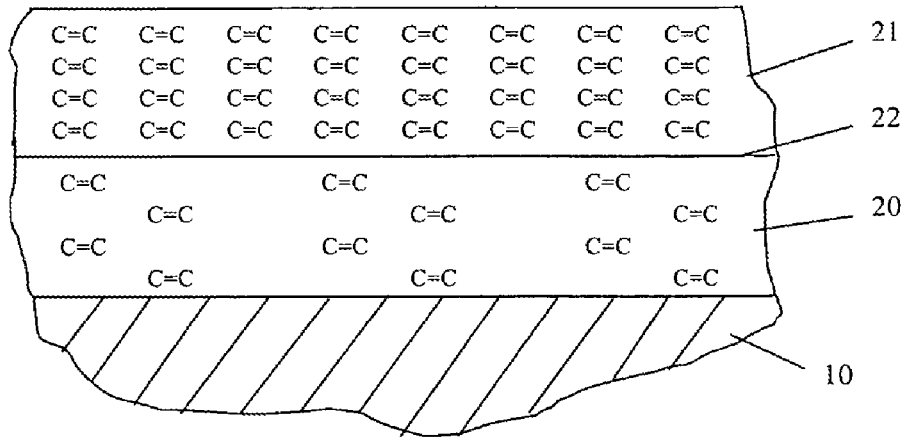
FIGS. 2A to 2C are schematic views, wherein the process of the mixing of two liquid layers is shown.
Figure 2B:
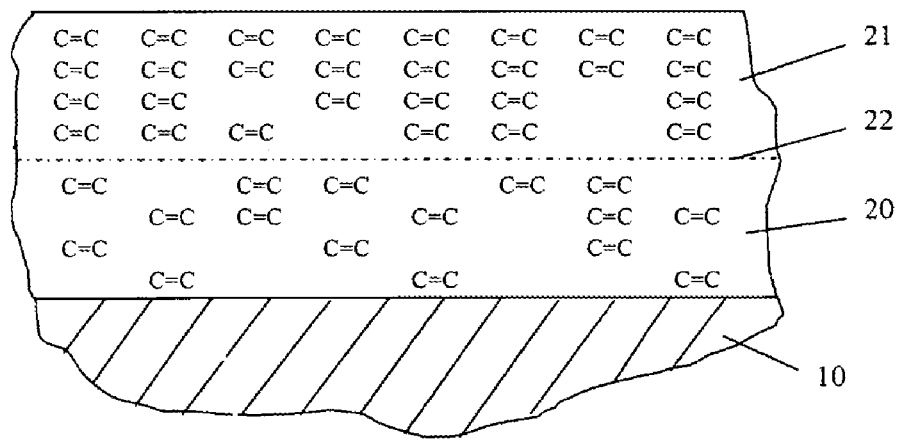
Figure 2C:
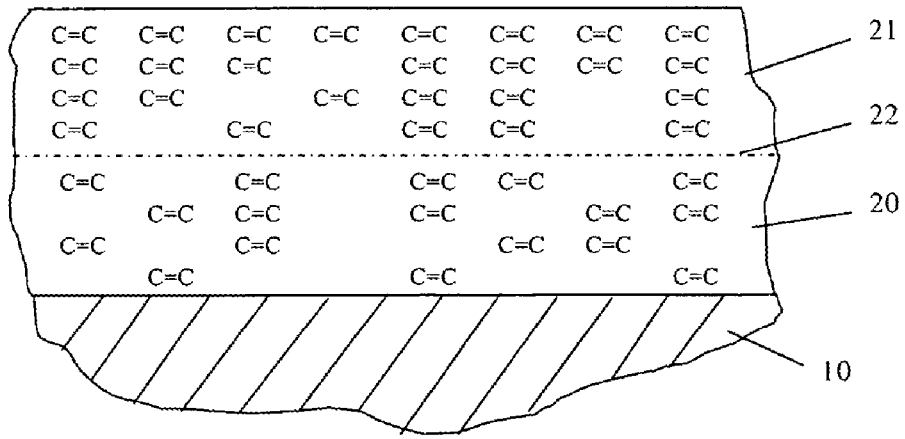

The principle of mixing of the two applied coating agents can be seen at its best from the schematic views of the FIGS. 2A to 2C. Herein, FIG. 2A shows the state of the two coating agents 20 and 21, which have been applied onto a wood material board 10, directly after the application of the second coating agent 21. At that point of time, no mentionable mixing has taken place. The coating agents 20 and 21 are in that case polymers, which each comprise different numbers of C—C carbon-double bonds. As schematically indicated in FIG. 2A, the first coating agent 20 comprises a lower number of C—C double bonds than the second coating agent 21. Due to the larger number of C—C double bonds in the second coating agent 21, the second coating agent 21 will comprise a higher hardness than the first coating agent 20, which comprises less C—C double bonds after the curing.

Since both coating agents 20 and 21 are applied wet-in-wet, a mixing happens starting from the border 22 between the two layers, as it is indicated in FIG. 2B. That means, that in the area near to the border 22 of the lower layer more double bonds are present and accordingly in the area near to the border 22 of the upper layer less double bonds are located than prior to the mixing due to the mixing process. FIG. 2C shows the two layers after the mixing is a little more progressed and has reached a sufficient degree of mixing. When the curing of the coating agents, like for instance by means LTV-radiation, is carried out at that point of time, this degree of mixing is fixed, since in the cured layers no more mixing can happen.

Figure 3:
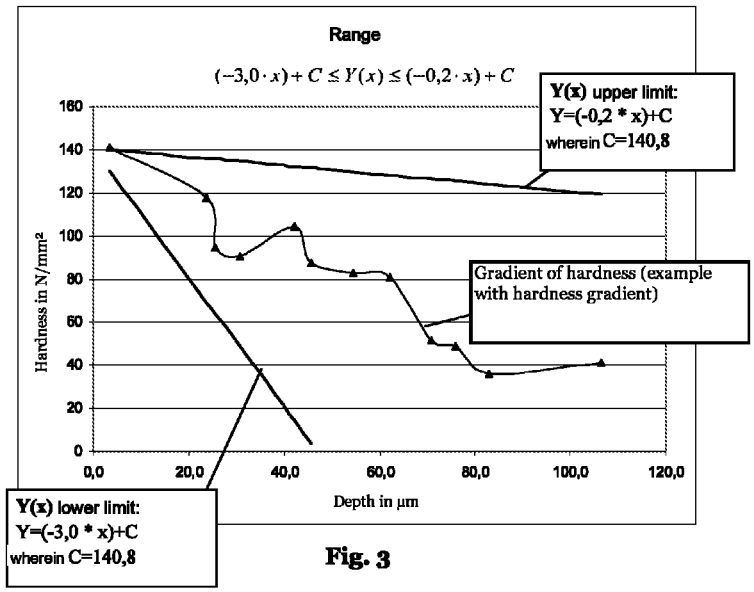
FIGS. 3 to 5 are diagrams, which show the gradient of the hardness depending on the depth of the coating.

In the diagram of FIG. 3 a gradient of the hardness of the coating with hardness gradient and of the coating without hardness gradient (labeled with: "prior art") is shown. The example with hardness gradient was a grinded wood material board, which was provided with a primer layer on which two different coating agents have been applied wet-in-wet. The first applied coating agent comprised about 35% 1,6-hexandioldiacrylate and about 65% polyestheracrylate and has been applied in a thickness of 45 g/m². The second coating agent, which has been applied onto the still wet first layer comprised about 70% polyurethanacrylacidesther and about 30% dipropylendiglycoldiarcylate and was applied in a thickness of about 40 g/m². After the application of the second layer, it has been waited for 10 seconds in order to give the viscose liquid materials the chance to mix themselves. In the following the two layers have been completely cured in one single common step. The example without hardness gradient consisted of a common coating, wherein several thin material layers have been individually applied and wherein between the specific application processes, the layer, which has been applied before, has been cured. The lower three layers consisted of a mixture, comprising 70% polyestheracrylate and 30% 1,6-hexandioldiacrylate with a thickness of each of about 12 g/m². The two upper layers consisted of 70% polyurethanglycoldiarcylate and 30% dipropylenarcylacidesther and the two upper layers comprised 15% corundum with the mean particle size of D 50 of 25 μm.

The test has been carried out according to the European standard for laminate floorings DIN EN 13329 with a Tabor Abraser Measurement System 5151 of the company Tabor Industries. After 200 rotations with S-41-sanding paper, the hardness and the depth of the grooves of the samples has been determined. The determination of the Martens hardness (registering hardness examination under the impact of a test force) has been carried out according to DIN EN ISO 14577. A "Fischerscope H100" of the Helmut Fischer GmbH has been used as measurement system. The following test parameters have been used: maximum force 50/30 mN and test duration 20 seconds. The determination of the groove depth has been carried out by means of a mechanical stylus measurement instrument. A perthometer S3P of the company Perthen has been used as measurement system.

During the examination of the samples it has been shown that more or less large deviations in the hardness occur for a given layer depth due to the used relatively weak materials. It is thus necessary to measure at several points in order to get reliant and representative data by means of a mean value calculation. During the carried out measurements, the hardness as well as the groove depth has been measured after 200 rotations of the sanding paper each at four points. It has been shown that four measurement points provide in most cases a sufficient validity. Of course, more valid measurement results can be achieved, when more than four measurement points are used, like for instance eight.

In the table shown below, the single measurement values for the sample of the example according to the invention are listed. The measurement has been carried out with completely cured coatings, i. e. in the state, in which the corresponding products would be also used in realty as flooring panels.

TABLE 1

Example with hardness gradient

| Rotation | Depth of groove in μm | | | | Depth of the hardness measurement in μm | | | | Martens hardness in N/mm² | | | |
|---|---|---|---|---|---|---|---|---|---|---|---|---|
| | 1 | 2 | 3 | 4 | 1 | 2 | 3 | 4 | 1 | 2 | 3 | 4 |
| MW | | | | | 3.6 | 3.8 | 3.3 | 3.4 | 134.8 | 118.7 | 159.0 | 150.6 |
| | | | | | | 3.5 | | | | 140.8 | | |
| 200 | 20.0 | 20.0 | 20.0 | 20.0 | 3.5 | 3.7 | 4.3 | 3.9 | 139.7 | 125.2 | 93.5 | 112.2 |
| MW | | 20.0 | | | | 3.9 | | | | 117.7 | | |
| 400 | 20.0 | 20.0 | 20.0 | 25.0 | 4.5 | 5.0 | 4.0 | 3.9 | 85.9 | 69.9 | 108.9 | 113.2 |
| MW | | 21.3 | | | | 4.4 | | | | 84.5 | | |
| 600 | 25.0 | 25.0 | 25.0 | 30.0 | 4.7 | 4.7 | 4.3 | 4.0 | 80.5 | 79.6 | 95.0 | 106.1 |
| MW | | 26.3 | | | | 4.4 | | | | 90.3 | | |
| 800 | 30.0 | 30.0 | 30.0 | 35.0 | 4.1 | 4.1 | 4.0 | 4.2 | 103.8 | 103.1 | 109.7 | 100.3 |
| MW | | 31.3 | | | | 4.1 | | | | 104.2 | | |
| 1000 | 40.0 | 40.0 | 40.0 | 45.0 | 4.7 | 4.2 | 3.9 | 4.5 | 78.5 | 99.3 | 112.0 | 87.5 |
| MW | | 41.3 | | | | 4.3 | | | | 94.3 | | |
| 1200 | 50.0 | 50.0 | 50.0 | 50.0 | 4.3 | 5.4 | 4.2 | 4.6 | 93.7 | 59.8 | 98.5 | 82.8 |
| MW | | 50.0 | | | | 4.6 | | | | 83.7 | | |
| 1400 | 55.0 | 55.0 | 60.0 | 60.0 | 5.4 | 4.5 | 4.0 | 5.0 | 60.1 | 85.0 | 106.7 | 70.8 |
| MW | | 57.5 | | | | 4.7 | | | | 80.7 | | |
| 1600 | 60.0 | 65.0 | 70.0 | 70.0 | 4.7 | 4.4 | 4.3 | 4.6 | 47.8 | 53.6 | 55.5 | 48.9 |
| MW | | 66.3 | | | | 4.5 | | | | 51.5 | | |
| 1800 | 65.0 | 70.0 | 75.0 | 75.0 | 4.0 | 4.6 | 4.9 | 5.3 | 64.5 | 50.1 | 43.7 | 37.1 |
| MW | | 71.3 | | | | 4.7 | | | | 48.9 | | |
| 2000 | 75.0 | 80.0 | 80.0 | 75.0 | 5.8 | 4.9 | 6.2 | 5.0 | 31.3 | 43.6 | 27.3 | 41.6 |
| MW | | 77.5 | | | | 5.5 | | | | 36.0 | | |
| 2200 | 95.0 | 105.0 | 105.0 | 100.0 | 4.5 | 5.1 | 6.1 | 4.9 | 51.4 | 40.8 | 28.1 | 43.7 |
| MW | | 101.3 | | | | 5.2 | | | | 41.0 | | |

In the table shown above, the column "rotation" lists the number of rotations which have been carried out by means of the Tabor Abraser Measurement System. The column "depth of the groove" lists, how many micrometers of material of the coating has been abrased starting from the original surface at the four measurement points 1-4. The column "depth of hardness measurement" lists, how many micrometers the test probe penetrates into the coating at the four measurement points 1-4. In the column "Martens hardness" then the hardness in Newton per mm² is listed for the four measurement points 1-4. Beyond the single values the corresponding mean value is listed for the four measurement points. It can be gathered well from the table shown above that the Martens hardness decreases the deeper the cured, finished layer is penetrated. It can be also gathered that at 800 and 1000 (complete) rotations a slight increase of the Martens hardness is determined. This is based on an inhomogenious mixing of the two used coating agents, which is in practice difficult to avoid completely.

Nevertheless, it can be gathered from the chart of FIG. 3 dearly that in the example with hardness gradient all in all a nearly continuous hardness decrease without large steps is on hand. The comparison example without hardness gradient shows contrary to that no such continuous gradient of the hardness, but shows at a depth of 60 to 80 μm a significant step up to the original initial hardness.

The mean values of the sample are listed in table 2 below.

TABLE 2

Mean values of the example with hardness gradient

| Rotation | Depth in μm | Martens hardness in N/mm² | Standard deviation of the Martens hardness in N/mm² |
|---|---|---|---|
| | 3.5 | 140.8 | 15.4 |
| 200 | 23.9 | 117.7 | 17.0 |

TABLE 2-continued

Mean values of the example with hardness gradient

| Rotation | Depth in μm | Martens hardness in N/mm² | Standard deviation of the Martens hardness in N/mm² |
|---|---|---|---|
| 400 | 25.6 | 94.5 | 17.6 |
| 600 | 30.7 | 90.3 | 11.0 |
| 800 | 42.1 | 104.2 | 3.4 |
| 1000 | 45.8 | 87.5 | 12.6 |
| 1200 | 54.6 | 82.8 | 14.9 |
| 1400 | 62.2 | 80.7 | 17.4 |
| 1600 | 70.8 | 51.4 | 3.2 |
| 1800 | 76.0 | 48.9 | 10.1 |

TABLE 2-continued

Mean values of the example with hardness gradient

| Rotation | Depth in μm | Martens hardness in N/mm² | Standard deviation of the Martens hardness in N/mm² |
|---|---|---|---|
| 2000 | 83.0 | 35.9 | 6.8 |
| 2200 | 106.4 | 41.0 | 8.4 |

The values of the comparison example without hardness gradient are listed in tables 3 and 4 below.

TABLE 3

Samples without hardness gradient

| Rotation | Depth of groove in μm | | | | Depth of the hardness measurement in μm | | | | Martens hardness in N/mm² | | | |
|---|---|---|---|---|---|---|---|---|---|---|---|---|
| | 1 | 2 | 3 | 4 | 1 | 2 | 3 | 4 | 1 | 2 | 3 | 4 |
|  |  |  |  |  | 3.1 | 3.5 | 3.1 | 3.0 | 180.6 | 141.8 | 173.1 | 192.4 |
| MW |  |  |  |  |  | 3.2 |  |  |  | 172.0 |  |  |
| 200 | 30.0 | 25.0 | 25.0 | 25.0 | 4.2 | 4.2 | 3.7 | 4.7 | 99.9 | 99.6 | 124.5 | 79.3 |
| MW |  | 26.3 |  |  |  | 4.2 |  |  |  | 100.8 |  |  |
| 400 | 35.0 | 35.0 | 35.0 | 35.0 | 3.7 | 3.8 | 4.0 | 4.1 | 126.9 | 117.2 | 110.1 | 105.3 |
| MW |  | 35.0 |  |  |  | 3.9 |  |  |  | 114.9 |  |  |
| 600 | 45.0 | 45.0 | 45.0 | 45.0 | 3.7 | 3.8 | 4.6 | 4.8 | 128.4 | 122.2 | 83.2 | 74.7 |
| MW |  | 45.0 |  |  |  | 4.2 |  |  |  | 102.1 |  |  |
| 800 | 50.0 | 50.0 | 50.0 | 50.0 | 4.0 | 4.7 | 4.8 | 4.0 | 108.2 | 80.8 | 75.4 | 110.9 |
| MW |  | 50.0 |  |  |  | 4.4 |  |  |  | 93.8 |  |  |
| 1000 | 60.0 | 60.0 | 60.0 | 60.0 | 3.5 | 3.1 | 4.0 | 3.6 | 143.7 | 177.4 | 108.0 | 129.9 |
| MW |  | 60.0 |  |  |  | 3.6 |  |  |  | 139.8 |  |  |
| 1200 | 66.0 | 70.0 | 70.0 | 70.0 | 3.3 | 3.4 | 3.6 | 3.0 | 160.7 | 145.1 | 135.0 | 185.1 |
| MW |  | 68.8 |  |  |  | 3.3 |  |  |  | 156.5 |  |  |
| 1400 | 70.0 | 75.0 | 75.0 | 75.0 | 3.3 | 3.0 | 3.1 | 3.8 | 157.7 | 191.6 | 178.0 | 119.3 |
| MW |  | 73.8 |  |  |  | 3.3 |  |  |  | 161.7 |  |  |
| 1600 | 75.0 | 80.0 | 80.0 | 80.0 | 2.3 | 2.9 | 2.6 | 2.4 | 183.8 | 124.8 | 147.9 | 174.4 |
| MW |  | 78.8 |  |  |  | 2.6 |  |  |  | 157.7 |  |  |
| 1800 | 80.0 | 85.0 | 85.0 | 85.0 | 3.8 | 3.0 | 3.4 | 3.1 | 71.4 | 112.3 | 88.6 | 107.0 |
| MW |  | 83.8 |  |  |  | 3.3 |  |  |  | 94.8 |  |  |
| 2000 | 85.0 | 90.0 | 85.0 | 85.0 | 5.1 | 3.5 | 2.6 | 3.0 | 40.9 | 82.3 | 146.4 | 112.6 |
| MW |  | 86.3 |  |  |  | 3.6 |  |  |  | 95.6 |  |  |
| 2200 | 85.0 | 95.0 | 90.0 | 90.0 | 3.6 | 3.0 | 3.0 | 2.7 | 81.2 | 116.0 | 114.5 | 137.5 |
| MW |  | 90.0 |  |  |  | 3.1 |  |  |  | 112.3 |  |  |
| 2400 | 90.0 | 100.0 | 100.0 | 95.0 | 3.7 | 5.2 | 3.1 | 3.0 | 77.6 | 39.7 | 108.2 | 111.8 |
| MW |  | 96.3 |  |  |  | 3.8 |  |  |  | 84.3 |  |  |
| 2600 | 100.0 | 100.0 | 105.0 | 100.0 | 5.3 | 3.3 | 5.0 | 3.9 | 37.8 | 92.6 | 42.4 | 67.7 |
| MW |  | 101.3 |  |  |  | 4.4 |  |  |  | 60.1 |  |  |

TABLE 4

Mean values of the sample without hardness gradient

| Rotation | Depth in μm | Martens hardness in N/mm² | Standard deviation of the Martens hardness in N/mm² |
|---|---|---|---|
|  | 3.2 | 172.0 | 18.7 |
| 200 | 30.4 | 100.8 | 16.0 |
| 400 | 38.9 | 114.9 | 8.1 |
| 600 | 49.2 | 102.1 | 23.5 |
| 800 | 54.4 | 93.8 | 15.9 |
| 1000 | 63.6 | 139.8 | 25.2 |
| 1200 | 72.1 | 156.5 | 18.9 |
| 1400 | 77.1 | 169.7 | 27.3 |
| 1600 | 81.3 | 157.7 | 23.1 |
| 1800 | 87.1 | 94.8 | 16.1 |
| 2000 | 89.8 | 95.6 | 38.9 |
| 2200 | 93.1 | 112.3 | 20.1 |
| 2400 | 100.0 | 84.3 | 29.0 |
| 2600 | 105.7 | 60.1 | 21.9 |

It has been shown by way of experiments that particularly good mechanical properties of the completely finished coating can be achieved when the hardness gradient of the finished entire coating—as it is exemplarily shown in FIG. 3—corresponds in general to the following relation:

$$(-3.0 \cdot x) + C \leq Y(x) \leq (-0.2 \cdot x) + C$$

wherein:
is the total value of the depth in μm of the coating as seen from the surface of the coating;
$Y(x)$ is the total value of the hardness in N/mm² at a specific depth x; and
C is the total value of the initial hardness in N/mm² of the coating at a depth of x≈0–5 μm.

The "total" values have to be understood in that only the pure numbers are used for the above mentioned formula, i. e. without the corresponding units "μm" or "N/mm²". When for example the initial value of the above mentioned example with hardness gradient is 140.8 N/mm² (cf. table 2) so in the above mentioned formula only the absolute values are used, i. e. C=140.8. In the same way for x only the absolute values, i. e. for example x=3.5 is used. Thus, for example upper and lower limits result for Y(x=3.5) of 140.1 and respectively of 130.3. At a depth of x=40 μm then results for example 132.8 for the upper limit and respectively 20.8 for the lower limit. These upper and lower limits of Y(x) have the unit N/mm². It is important that the absolute values are used starting from the mentioned unit "μm" or "N/mm²" in the formula and not for instance starting from "mm" or "N/m²". It should be clear to the person skilled in the art that the above mentioned formula is no mathematic formula for the description of the hardness gradient itself, but it rather defines a range, in which it shall be located.

The initial value of the hardness of the coating is the value in the first few micrometers of the coating. Due to the commonly used measurement method by means of a probe pin, which enters some micrometers into the coating, it is difficult to determine the hardness for the entering depth "0 µm". The phrase "in general" is thus chosen, because it is difficult to achieve a perfectly homogenous mixing of the materials so that in reality again and again small outliers occur, like for instance the hardness value of 140.2 N/mm² at a depth of 42.1 µm (cf. table 2) of the example with hardness gradient as discussed above. Moreover, the values, which are located extremely near to the surface of the wood material board are often inaccurate, since the remaining layer thickness to be measured has to comprise a specific minimum thickness in order to allow reliant measurements. The remaining layer thickness should thus be at least 5 µm, preferably 10 µm and even more preferred at least 20 µm for reliant measurements. In other words, the last 20 µm of the layer near to the wood material plate do not have necessarily to follow the above discussed preferred hardness gradient, but this is of course preferred.

In a further preferred embodiment, the hardness gradient fulfills in general the following relation:

$$(-2.5 \cdot x)+C \leq Y(x) \leq (-0.4 \cdot x)+C$$

And in an even more preferred embodiment in general:

$$(-2.0 \cdot x)+C \leq Y(x) \leq (-0.6 \cdot x)+C$$

Figure 4:
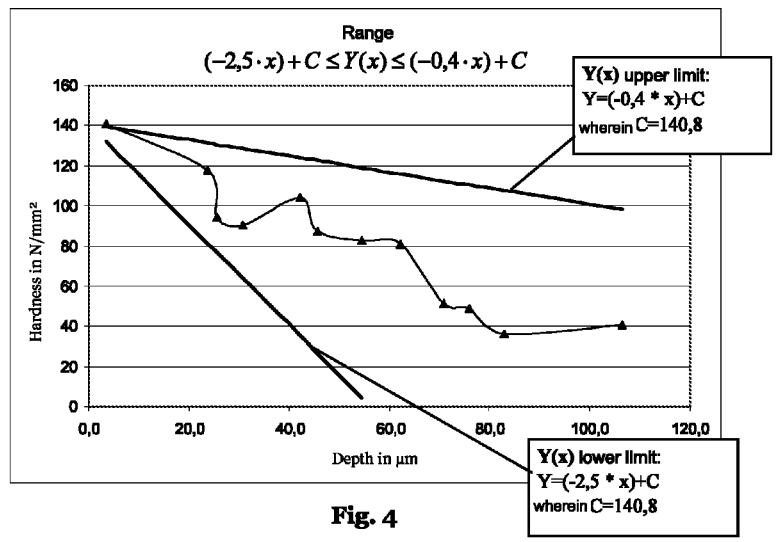
Figure 5:
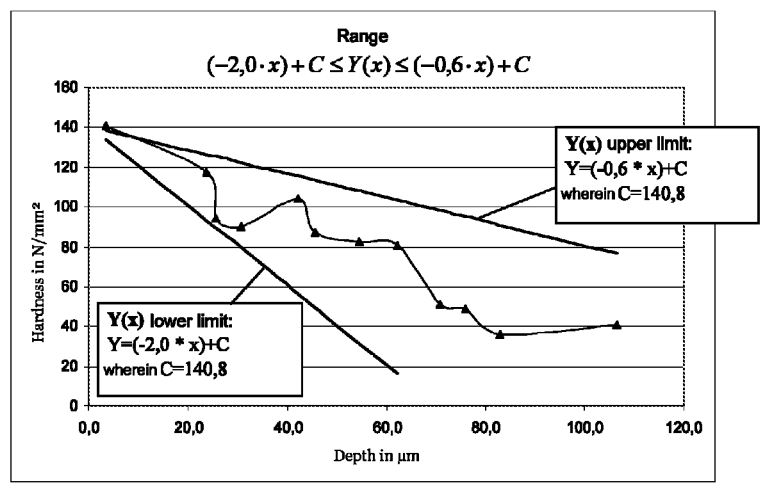
Figure 6:
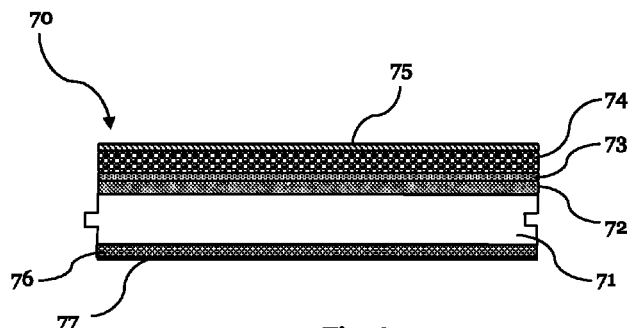
FIG. 6 shows an exemplary panel according to the invention in a schematic view.

In the FIGS. 4 to 6 the importance of the above mentioned relationships of the hardness gradients are explained by means of the example with hardness gradient. It should be clear that the discussed absolute values for the hardness and depth are just to be understood by way of example. Of course, it is also possible to apply entire layers with significantly larger thicknesses or lower thicknesses. Moreover, the absolute value of the hardness depends of course on the used materials and can be also larger or lower than the values of the example with hardness gradient. But the order of magnitude of the mentioned values for the example with hardness gradient are particularly preferred and suitable for the use in a floor panel.

FIG. 6 shows in a schematic view a panel according to the invention. The shown panel is a floor panel and comprises a carrier layer 71 made of MDF. FIG. 7 is not true to scale: the carrier layer 71 comprises in practice a thickness of several millimeters, whereas the layers, which are provided on the front side thereof, comprise just an overall thickness of several hundred micrometers. At the front side of the carrier layer 71 a primer layer 72 is applied. The primer layer 72 bases on an aqueous acrylate system and is preferably applied by means of a curtain coating method. After the drying of the primer layer 72 the decor layer 73 is applied by means of digital printing by the use of a polymerizable print color. Optionally, between the primer layer 72 and decor layer 73 further layers can be provided, like for instance a suitable priming coat. In the same way, optional further layers may be provided between the carrier layer 71 and the primer layer 72, like for instance filler layers, but also further priming coats in order to increase the adhesion of the primer layer 72 at the front side of the carrier layer 71. Such further primer- and filler layers are known to the person skilled in the art so that a more detailed description thereof is omitted. As initially explained, a polymer layer 74 is applied directly onto the decor layer 73, for which a polymerizable print color has been used, like for instance basing on a polymerizable acrylate comprising a hardness gradient. The decor layer 73 as well as the polymer layer 74 have been cured together in one single common step. Preferably, the layers comprise therefore photoinitiators, so that for instance a polymerization and thus a curing of the two layers 73 and 74 is carried out by radiation with UV-radiation. Optionally, a further thin layer 75 made of high gloss lacquer is applied.

At the rear side of the carrier layer 71, a thin layer of a footfall sound insolation 76 is provided. The footfall sound insolation may be for instance a thin fiber fleece of 1 to 2 mm. As finishing layer at the rear side of the carrier layer in addition a foil 77 is provided, which serves as humidity protection.

The invention claimed is:

1. A panel for use as a wall, ceiling or floor panel, comprising
    a carrier layer having a front side and a rear side, the carrier layer having on the front side at least the following layers in the following order:
    a primer layer;
    a decor layer comprising a polymerizable print color; and
    a polymer layer having a front surface and a rear surface, wherein the polymer layer has a hardness gradient such that the hardness of the polymer layer continuously decreases with increasing depth from the front surface of the polymer layer,
    wherein the print color of the decor layer is crosslinked with the polymer layer at an interface of the decor layer and the polymer layer.

2. The panel according to claim 1, wherein the print color is based on a polymerizable acrylate.

3. The panel according to claim 1, wherein the print color of the decor layer and the polymer layer have been cured in one common step together.

4. The panel according to claim 1, wherein the decor layer has been applied by digital printing.

5. The panel according to claim 1, wherein between the decor layer and the polymer layer no further layer is present.

6. The panel according to claim 1, wherein the hardness gradient in general follows the following relation:

$$(-3.0 \cdot x)+C \leq Y(x) \leq (-0.2 \cdot x)+C$$

wherein
    x is the absolute value of the depth in micrometer of the coating as seen from the front surface of the coating;
    Y(x) is the absolute value of the hardness in N/mm² at a specific depth x; and
    C is the absolute value of the initial hardness in N/mm² of the coating at about x≈0-5 µm depth.

7. The panel according to claim 6, wherein the hardness gradient corresponds in general to the following relation:

$$(-2.5 \cdot x)+C \leq Y(x) \leq (-0.4 \cdot x)+C(-2,0 \cdot x)+C \leq Y(x) \leq (-0.6 \cdot x)+C.$$

8. The panel according to claim 1, wherein the polymer layer comprises a thickness of 20-300 µm.

9. The panel according to claim 1, wherein the primer layer comprises a thickness of 20-300 µm.

10. The panel according to claim 1, wherein the primer layer is no UV-curing lacquer.

11. The panel according to claim 1, wherein the primer layer is based on an aqueous acrylate system.

12. The panel according to claim 1, wherein the primer layer has been applied by a curtain coating method.

13. The panel according to claim 1, wherein the polymer layer is based on one or more of the following acrylates: 1,6 hexandioldiacrylate, polyesteracrylate, polyurethanacrylacidester and dipropylenglycoldiacrylate.

14. The panel according to claim 1, wherein the front surface of the polymer layer achieves in the grid cut test according to DIN ISO 2409 a grid cut parameter of at least 2.

15. A method for the coating of a panel, comprising the following steps:
  (i) providing a carrier board;
  (ii) applying a primer layer on the carrier board;
  (iii) applying on the primer layer a decor layer including a polymerizable print color;
  (iv) optionally: partially curing the print color;
  (v) applying a first liquid coating agent onto the incompletely cured print color;
  (vi) applying at least a second liquid coating agent onto the still wet first coating agent so that a partial mixing of the coating agents takes place; and
  (vii) curing at least the applied coating agents and the print color in one common step together by using radiation, such that the cured coating agents comprise a hardness gradient, wherein the hardness of the cured coating agents decreases with increasing depth from a front surface of the resulting coating and wherein the print color of the decor layer is crosslinked with the first liquid coating agent at an interface of the decor layer and the first liquid coating agent.

16. The method according to claim 15, wherein the primer layer in step (ii) is applied by a curtain coating method.

17. The method according to claim 15, wherein the primer layer is dried after step (ii) and before step (iii).

18. The method according to claim 15, wherein the decor layer is applied by digital printing.

19. The method according to claim 15, wherein the coating agents are directly applied onto the decor layer.

20. The method according to claim 15, wherein the hardness gradient in general corresponds to the following relation:

$$(-3.0 \cdot x) + C \leq Y(x) \leq (-0.2 \cdot x) + C$$

wherein:
  x is the absolute value of the depth in micrometer of the coating as seen from the front surface of the coating;
  $Y(x)$ is the absolute value of the hardness in N/mm² at a specific depth x; and
  C is the absolute value of the initial hardness in N/mm² of the coating at about x≈0-5 µm depth.

21. The method according to claim 15, wherein the hardness gradient corresponds in general to the following relation:

$$(-2.5 \cdot x) + C \leq Y(x) \leq (-0.4 \cdot x) + C.$$

22. The method according to claim 15, wherein the coating agents comprise a total thickness of 20-300 µm.

23. The method according to claim 15, wherein the primer layer comprises a thickness of 20-300 µm.

24. The method according to claim 15, wherein the primer layer is no UV-curing lacquer.

25. The method according to claim 15, wherein the coating agents are based on one or more of the following acrylates: 1,6 hexandioldiacrylate, polyesteracrylate, polyurethanacrylacidester and dipropylenglycoldiacrylate.

26. The method according to claim 1, wherein the decor layer consists of print color.

* * * * *